US012723287B2

(12) United States Patent
Ichihara et al.

(10) Patent No.: US 12,723,287 B2
(45) Date of Patent: Sep. 1, 2026

(54) GRAIN-ORIENTED ELECTRICAL STEEL SHEET AND METHOD OF MANUFACTURING SAME

(71) Applicant: JFE STEEL CORPORATION, Tokyo (JP)

(72) Inventors: Yoshihisa Ichihara, Tokyo (JP); Takeshi Omura, Tokyo (JP); Kunihiro Senda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 754 days.

(21) Appl. No.: 17/757,776

(22) PCT Filed: Dec. 23, 2020

(86) PCT No.: PCT/JP2020/048253
§ 371 (c)(1),
(2) Date: Jun. 21, 2022

(87) PCT Pub. No.: WO2021/132378
PCT Pub. Date: Jul. 1, 2021

(65) Prior Publication Data

US 2023/0042199 A1 Feb. 9, 2023

(30) Foreign Application Priority Data

Dec. 25, 2019 (JP) ................................ 2019-233922

(51) Int. Cl.
*C21D 9/46* (2006.01)
*C21D 1/34* (2006.01)
(Continued)

(52) U.S. Cl.
CPC ................ *C21D 9/46* (2013.01); *C21D 1/34* (2013.01); *C21D 6/008* (2013.01); *H01F 1/16* (2013.01);
(Continued)

(58) Field of Classification Search
CPC ........................................................ C21D 9/46
See application file for complete search history.

(56) References Cited

U.S. PATENT DOCUMENTS 9,761,361 B2 9/2017 Okabe et al.
9,875,832 B2 1/2018 Yamaguchi et al.
(Continued)

FOREIGN PATENT DOCUMENTS

CN 101528951 A 9/2009
CN 104105808 A 10/2014
(Continued)

OTHER PUBLICATIONS

Sep. 30, 2022, the Extended European Search Report issued by the European Patent Office in the corresponding European Patent Application No. 20905461.8.
(Continued)

*Primary Examiner* — Christopher S Kessler
(74) *Attorney, Agent, or Firm* — KENJA IP LAW PC

(57) ABSTRACT

Provided is a grain-oriented electrical steel sheet having both low iron loss and good magnetostrictive properties, with which a transformer having excellent properties can be manufactured. The grain-oriented electrical steel sheet of the present disclosure has a linear strain region extending linearly in a direction intersecting the rolling direction, where the linear strain region has a region having compressive stress in the rolling direction, and a region adjacent in a rolling direction to the region having compressive stress has a region having tensile stress in the rolling direction.

14 Claims, 10 Drawing Sheets

(51) Int. Cl.

| | |
|---|---|
| ***C21D 6/00*** | (2006.01) |
| ***H01F 1/16*** | (2006.01) |
| ***H01F 41/02*** | (2006.01) |

(52) U.S. Cl.
CPC ......... *H01F 41/02* (2013.01); *C21D 2201/05* (2013.01)

(56) References Cited

U.S. PATENT DOCUMENTS

| | | | |
|---|---|---|---|
| 9,984,800 | B2 | 5/2018 | Takajo et al. |
| 10,559,410 | B2 | 2/2020 | Okabe et al. |
| 11,866,796 | B2 * | 1/2024 | Ichihara ............... C21D 10/005 |
| 2009/0272464 | A1 | 11/2009 | Hamamura et al. |
| 2014/0338792 | A1 | 11/2014 | Takajo et al. |
| 2015/0013849 | A1 | 1/2015 | Okabe et al. |
| 2015/0187474 | A1 | 7/2015 | Takajo et al. |
| 2019/0112697 | A1 | 4/2019 | Hiratani et al. |

FOREIGN PATENT DOCUMENTS

| | | | |
|---|---|---|---|
| CN | 108884535 | A | 11/2018 |
| EP | 2083091 | A1 | 7/2009 |
| EP | 2799580 | A1 | 11/2014 |
| JP | S61157631 | A | 7/1986 |
| JP | H0222423 | A | 1/1990 |
| JP | H0622179 | B2 | 3/1994 |
| JP | H07192891 | A | 7/1995 |
| JP | 2005248291 | A | 9/2005 |
| JP | 2008106288 | A | 5/2008 |
| JP | 2012035302 | A | 2/2012 |
| JP | 2012140665 | A | 7/2012 |
| JP | 2013139590 | A | 7/2013 |
| KR | 1020120073913 | A | 7/2012 |
| KR | 1020140103995 | A | 8/2014 |
| KR | 1020150036775 | A | 4/2015 |
| RU | 2400542 | C1 | 9/2010 |
| RU | 2565239 | C1 | 10/2015 |
| RU | 2569260 | C2 | 11/2015 |
| RU | 2570591 | C1 | 12/2015 |
| RU | 2575271 | C1 | 2/2016 |
| RU | 2576355 | C1 | 2/2016 |
| RU | 2620833 | C1 | 5/2017 |

OTHER PUBLICATIONS

ATI, Technical Data Sheet Grain-Oriented Electrical Steel, Mar. 1, 2012, XP055964088, retrieved from the Internet: URL: https://www.spacematdb.com/spacemat/manudatasheets/crgo.pdf, retrieved on Sep. 23, 2022.

Jan. 30, 2023, Office Action issued by the Federal Service for Intellectual Property, Patents and Trademarks of the Russian Federation in the corresponding Russian Patent Application No. 2022118372 with English language search report.

Feb. 23, 2024, Office Action issued by the China National Intellectual Property Administration in the corresponding Chinese Patent Application No. 202080082447.1 with English language search report.

Dec. 8, 2023, Office Action issued by the Korean Intellectual Property Office in the corresponding Korean Patent Application No. 10-2022-7014281 with English language concise statement of relevance.

Apr. 26, 2022, Notification of Reasons for Refusal issued by the Japan Patent Office in the corresponding Japanese Patent Application No. 2021-518825 with English language Concise Statement of Relevance.

Mar. 16, 2021, International Search Report issued in the International Patent Application No. PCT/JP2020/048253.

* cited by examiner

GRAIN-ORIENTED ELECTRICAL STEEL SHEET AND METHOD OF MANUFACTURING SAME

TECHNICAL FIELD

This disclosure relates to a grain-oriented electrical steel sheet suitable as an iron core material for transformers and the like, and to a method of manufacturing the grain-oriented electrical steel sheet.

BACKGROUND

Grain-oriented electrical steel sheets are used, for example, as a material for iron cores of transformers. It is required to suppress energy loss and noise in transformers, and the energy loss of a transformer and the noise of a transformer are affected by the iron loss of the grain-oriented electrical steel sheet and the magnetostrictive properties of the grain-oriented electrical steel sheet, respectively. There is a strong need particularly in recent years to reduce the energy loss in a transformer and the noise during the operation of a transformer because of energy conservation and environmental regulations. Therefore, it is very important to develop a grain-oriented electrical steel sheet having good iron loss and magnetostrictive properties.

The iron loss of a grain-oriented electrical steel sheet is mainly composed of hysteresis loss and eddy current loss. Methods that have been developed to improve the hysteresis loss include a method of highly orienting the (110)[001] orientation, which is called GOSS orientation, in the rolling direction of the steel sheet, and a method of reducing impurities in the steel sheet. Further, methods that have been developed to improve the eddy current loss include a method of increasing the electric resistance of the steel sheet by adding Si, and a method of applying film tension in the rolling direction of the steel sheet. However, these methods have manufacturing limitations in achieving even lower iron loss in grain-oriented electrical steel sheets.

As a result, magnetic domain refining technology has been developed as a method to achieve even lower iron loss in grain-oriented electrical steel sheets. Magnetic domain refining technology is a technique of introducing magnetic flux non-uniformity with a physical method, such as forming grooves or locally introducing strain, to a steel sheet after final annealing or after insulating coating baking or the like to refine the width of 180° magnetic domain (main magnetic domain) formed along the rolling direction, thereby reducing the iron loss, especially the eddy current loss, of a grain-oriented electrical steel sheet.

For example, JPH0622179B (PTL 1) proposes a technique for reducing iron loss from 0.80 W/kg or more to 0.70 W/kg or less by introducing a linear groove having a width of 300 μm or less and a depth of 100 μm or less on the surface of a steel sheet.

Further, JPH07192891A (PTL 2) proposes a method of applying plasma flame in the sheet transverse direction on the surface of a steel sheet after secondary recrystallization to locally introduce thermal strain, thereby reducing the iron loss ($W_{17/50}$) when excited at a maximum magnetic flux density of 1.7 T and a frequency of 50 Hz to 0.680 W/kg in a case where the magnetic flux density ($B_8$) of a steel sheet when excited with a magnetizing force of 800 A/m is 1.935 T.

In general, a method of forming a linear groove as the one described in PTL 1 is referred to as heat-resistant magnetic domain refining because the magnetic domain refining effect does not disappear even if strain-removing annealing is performed after iron core forming. On the other hand, a method of introducing thermal strain as the one described in PTL 2 is referred to as non-heat-resistant magnetic domain refining because the effect of introducing thermal strain disappears due to strain-removing annealing.

CITATION LIST

Patent Literature

PTL 1: JPH0622179B
PTL 2: JPH07192891A

SUMMARY

Technical Problem

In the non-heat-resistant magnetic domain refining, the eddy current loss can be greatly reduced by locally introducing strain into a steel sheet. On the other hand, it is known that the non-heat-resistant magnetic domain refining leads to deterioration of hysteresis loss and deterioration of magnetostriction due to the introduction of strain. Therefore, it is required to optimize the pattern of introducing strain in the non-heat-resistant magnetic domain refining so that a grain-oriented electrical steel sheet with better iron loss and magnetostrictive properties than conventional ones can be developed and ultimately a transformer with better energy loss and noise properties than conventional ones can be developed.

It could thus be helpful to provide a grain-oriented electrical steel sheet having both low iron loss and good magnetostrictive properties, with which a transformer having excellent properties can be manufactured. It is also helpful to provide a method of manufacturing the grain-oriented electrical steel sheet.

Solution to Problem

As described above, the non-heat-resistant magnetic domain refining is a technique of introducing strain into a steel sheet and forming a local stress field to control magnetic domains. To develop a grain-oriented electrical steel sheet with both low iron loss and good magnetostrictive properties that can realize a transformer with lower energy loss and lower noise properties than conventional ones, we focused on the strain to be introduced into a steel sheet and the stress distribution and investigated their effects on the magnetic properties.

In the non-heat-resistant magnetic domain refining, thermal strain is locally introduced by applying an energy beam on the surface of a steel sheet after final annealing or after insulating coating baking or the like (hereinafter may be simply referred to as "steel sheet" or collectively as "grain-oriented electrical steel sheet before strain introduction") in a direction intersecting the rolling direction, for example. In this case, compressive stress remains with respect to the rolling direction at a location where the energy beam has been applied in the direction intersecting the rolling direction. In a grain-oriented electrical steel sheet in which crystal grains having GOSS orientation (110)[001], which serves as an easy magnetization axis, are accumulated in the rolling direction, the compressive stress acts in the rolling direction due to the introduction of thermal strain, and then a magnetic domain (closure domain) having a magnetization direction in the sheet transverse direction (that is, a direction orthogonal to the rolling direction) is formed because of an magnetoelastic effect.

The magnetoelastic effect is an effect that, when tensile stress is applied to a grain-oriented electrical steel sheet, the direction of the tensile stress becomes energetically stable, and when compressive stress is applied to a grain-oriented electrical steel sheet, a direction orthogonal to the compressive stress becomes energetically stable.

The formation of the closure domain promotes the effect of improving the eddy current loss of a grain-oriented electrical steel sheet. On the other hand, it is known that the hysteresis loss properties of a grain-oriented electrical steel sheet are deteriorated because the movement of magnetic domain wall caused by magnetization is pinned by the introduced strain, and additionally, that the noise properties of a manufactured transformer are deteriorated due to the formation of a region in which strain has been introduced.

To further study the closure domain, we investigated the strain distribution in a grain-oriented electrical steel sheet manufactured with a conventional method in detail. As a result, we found that, as illustrated in FIG. 1, there is a region II on the outside of a region I irradiated by an energy beam (or may be called as "an energy beam irradiation region I"), and in the region II, a strain having compressive stress in the rolling direction is formed over a wider area than a strain formed in the beam irradiation region I, that is, over a wider area than the irradiation region I where a closure domain is formed.

According to conventional common knowledge, it is considered that, because a closure domain with the same width in the rolling direction as the irradiation width in the rolling direction of the energy beam is formed, a strain introduced by the energy beam irradiation is also formed in a region corresponding to the beam irradiation region I.

However, we newly found that a strain having compressive stress in the rolling direction of the steel sheet is formed in a wider area than the irradiation region I in the rolling direction of the energy beam. Further, we speculated based on this finding that the excessively introduced strain may have an adverse effect on the magnetic properties of the grain-oriented electrical steel sheet.

To further investigate the effect of the excessively introduced strain, we compared the iron loss and the magnetostrictive properties of a grain-oriented electrical steel sheet where a linear strain had been introduced into the steel sheet under various energy beam irradiation conditions. As a result, it was found that, in a grain-oriented electrical steel sheet with improved iron loss and magnetostrictive properties, there is a stress distribution in which tensile stress in the rolling direction is formed from the vicinity of the beam irradiation region I, as schematically illustrated in FIG. 2. As described above, when tensile stress (tension) acts in the rolling direction of a grain-oriented electrical steel sheet, a magnetic domain oriented in the rolling direction is more stable because of the magnetoelastic effect working on the magnetic domain. We speculated that the tensile stress formed in the steel sheet may reduce the amount of auxiliary magnetic domain having a magnetization direction perpendicular to the rolling direction, leading to further magnetic domain refining and lower iron loss.

Based on these findings, we discovered that it is possible to obtain a grain-oriented electrical steel sheet that achieves both low iron loss and good magnetostrictive properties and can realize a transformer with low energy loss and low noise properties by having compressive stress in the rolling direction in a linear strain region introduced linearly in a direction intersecting the rolling direction, and having tensile stress in the rolling direction in a region adjacent to the rolling direction of the region with compressive stress (hereinafter may be simply referred to as "adjacent region"), thereby completing the present disclosure.

We also examined, when a linear strain region is formed by energy beam irradiation, the effect of the length in the rolling direction of the linear strain-introduced region, relative to the irradiation width in the rolling direction of the energy beam, under the conditions of a grain-oriented electrical steel sheet with the stress distribution described above. That is, the irradiation width (A) in the rolling direction of the energy beam and the length (B) in the rolling direction of the linear strain region introduced into the grain-oriented electrical steel sheet are related as schematically illustrated in FIG. 3 that the region of the length (B) extends outside the region of the irradiation width (A). After investigating grain-oriented electrical steel sheets with various B/A values, we found that both iron loss and magnetostrictive properties are further improved in a grain-oriented electrical steel sheet where the B/A value is 2 or less, that is, the length (B) is twice the irradiation width (A) or less.

The following describes the experimental results that led to the present disclosure.

<Experiment 1>

First, a steel strip (steel sheet in a strip shape) with a thickness of 0.23 mm manufactured with a known method was irradiated with electron beams having different irradiation widths (A) of 150 μm, 200 μm, and 300 μm in a direction intersecting the rolling direction to prepare a sample of a grain-oriented electrical steel sheet having a linear strain region. When applying the electron beam with each irradiation width (A), the steel strip was passed upward convexly along rollers of various diameters while applying the electron beam at the apex of the steel strip with various curvatures corresponding to the radius of curvature of the roller, thereby adjusting the length (B) in the rolling direction of the linear strain region to be introduced into the steel strip. We investigated the effect of the length (B) in the rolling direction of the linear strain region, relative to the irradiation width (A) in the rolling direction, on the iron loss and the maximum stress value of the grain-oriented electrical steel sheet and the noise properties of a transformer.

Here, the magnetic flux density $B_8$ of the steel strip was 1.92 T, and the magnetic flux density $B_8$ of the grain-oriented electrical steel sheet into which a linear strain region had been introduced was also 1.92 T.

The electron beam irradiation conditions were as follows: accelerating voltage: 60 kV, beam current: 10 mA, degree of vacuum in the beam irradiation region: 0.3 Pa, irradiation direction: about 90° with respect to the rolling direction, irradiation form: a continuous linear shape, and the radius of curvature of the roller used was 100 mm to 300 mm.

Note that the maximum stress value of the grain-oriented electrical steel sheet was measured with the strain scanning method described below.

The amount of change in iron loss with respect to the B/A value is illustrated in FIG. 4, the amount of change in noise with respect to the B/A value is illustrated in FIG. 5, and the maximum values of compressive stress and tensile stress in the rolling direction with respect to the B/A value are illustrated in FIG. 6. The amount of change in iron loss and the amount of change in noise are the amount of change in iron loss and the amount of change in noise after the electron beam irradiation compared to before the electron beam irradiation (value after irradiation−value before irradiation). For both of the amount of change in iron loss and the amount of change in noise, the lower it is indicated in the figure (the smaller the value of the amount of change is), the better the iron loss and the noise properties are.

Furthermore, FIGS. 4 and 5 illustrate that, as the B/A value decreases, the iron loss is reduced, and an increase in noise is suppressed. It was particularly confirmed that good effects of low iron loss and low noise can obviously be obtained when the B/A value is 2 or less, more specifically, when the B/A value is 1.6 or less.

With respect to the relationship between the B/A value and the maximum values of compressive stress and tensile stress in the rolling direction, FIG. 6 illustrates that, as the B/A value decreases, a tensile stress component is formed in the rolling direction, and especially when the B/A value is 2 or less, the maximum value of the tensile stress in the rolling direction increases significantly.

The reason why the tensile stress in the rolling direction increases as the B/A value decreases is not clear. However, we speculate the reason is as follows. As the B/A value decreases, the compressive stress in the rolling direction to be formed in an area wider than the irradiation width (A) in the rolling direction of the energy beam decreases. As a result, the compressive stress acts locally only on the beam irradiation region, and the surrounding areas adjacent to the irradiation region is pulled toward the irradiation region.

On the other hand, the reason of the improvement in iron loss is considered as follows. The formation of tensile stress in the rolling direction reduces the strain with compressive stress that pins the movement of magnetic domain wall. As a result, deterioration of iron loss, especially hysteresis loss, is suppressed.

The reason of the improvement in noise is considered as follows. The formation of tensile stress in the rolling direction decreases a region in which strain is formed due to the thermal effect of energy beam irradiation.

(Experiment 2)

Next, with the B/A value fixed at 1.5, a steel strip with a thickness of 0.23 mm manufactured with a known method was irradiated in a direction intersecting the rolling direction by changing the output of an electron beam (accelerating voltage: 60 kV to 300 kV, beam current: 10 mA to 20 mA) to prepare a sample of a grain-oriented electrical steel sheet having a linear strain region. When applying the electron beam, the steel strip was passed upward convexly along a roller while applying the electron beam at the apex of the steel strip with a curvature corresponding to the radius of curvature of the roller, as in Experiment 1 described above. A transformer was prepared using the sample of the grain-oriented electrical steel sheet that had been irradiated with the electron beam, as in the Examples described below. We investigated the effect of the maximum stress value in the rolling direction in the linear strain region on the iron loss of the grain-oriented electrical steel sheet and the noise properties of the transformer.

Here, the magnetic flux density $B_8$ of the steel strip was 1.92 T, and the magnetic flux density $B_8$ of the grain-oriented electrical steel sheet into which a linear strain region had been introduced was also 1.92 T.

The electron beam irradiation conditions were as follows: degree of vacuum in the beam irradiation region: 0.3 Pa, irradiation direction: about 90° with respect to the rolling direction, irradiation form: a continuous linear shape, and the radius of curvature of the used roller was 200 mm.

Note that the maximum stress value of the grain-oriented electrical steel sheet was measured with the strain scanning method described below.

The amount of change in iron loss with respect to the maximum value of compressive stress in the rolling direction of the linear strain region is illustrated in FIG. 7, and the amount of change in noise with respect to the maximum value of compressive stress in the rolling direction of the linear strain region is illustrated in FIG. 8. The amount of change in iron loss with respect to the maximum value of tensile stress in the rolling direction of an adjacent region located near the linear strain region is illustrated in FIG. 9, and the amount of change in noise with respect to the maximum value of tensile stress in the rolling direction of an adjacent region located near the linear strain region is illustrated in FIG. 10. For both of the amount of change in iron loss and the amount of change in noise, the lower it is indicated in the figure (the smaller the value of the amount of change is), the better the iron loss and the noise properties are.

Note that the yield stress of the grain-oriented electrical steel sheet used in the experiment was 350 MPa in each case.

According to FIGS. 7 and 8, it was confirmed that good effects of low iron loss and low noise can obviously be obtained when the maximum value of compressive stress in the rolling direction of the linear strain region is 60 MPa or more and 350 MPa or less, more specifically, 300 MPa or less.

According to FIGS. 9 and 10, it was confirmed that good effects of low iron loss and low noise can obviously be obtained when the maximum value of tensile stress in the rolling direction of the adjacent region is 5 MPa or more and 350 MPa or less, more specifically, 300 MPa or less.

The mechanism of the improvement in iron loss is considered as follows. The larger the compressive stress in the rolling direction of the linear strain region is, the more stable a closure domain is. As a result, the magnetic domain refining effect can be maintained even in higher excitation fields. Furthermore, it is considered that the larger the tensile stress in the rolling direction of an adjacent region located near the region with compressive stress is, the more stable a magnetic domain facing the rolling direction is, the higher the magnetic domain refining effect is.

On the other hand, when the compressive stress and the tensile stress in the rolling direction exceeded 350 MPa, which was the yield stress of the grain-oriented electrical steel sheet, the iron loss abruptly increased and deteriorated. The reason is considered as follows. When a plastic deformation area increases in a grain-oriented electrical steel sheet in which a strain exceeding the yield stress has been introduced, the movement of magnetic domain wall is pinned, and the hysteresis loss is significantly deteriorated.

The mechanism of suppressing deterioration in noise is considered as follows. That is, an increase in the tensile stress in the rolling direction of an adjacent region located near the irradiation region is considered to have decreased an auxiliary magnetic domain in a non-irradiation region and suppressed an increase in noise.

On the other hand, an increase in the compressive stress in the linear strain region including the irradiation region means an increase in a closure domain, which would normally induce deterioration in noise properties. However, as mentioned in Experiment 2 of the present disclosure, it is surprised to find that, as the compressive stress in the rolling direction increases, for example, to around 60 MPa, the noise decreases. The reason is considered as follows. In the present disclosure, as the compressive stress in the rolling direction of the linear strain region increases, the tensile stress in the rolling direction of the adjacent region (non-irradiation region) also increases, and the auxiliary magnetic domain in the non-irradiation region decreases. As a result, the noise decreases.

We thus provide the following.

(1) A grain-oriented electrical steel sheet having a linear strain region extending linearly in a direction intersecting a rolling direction of the steel sheet, wherein the linear strain region has a region having compressive stress in a rolling direction, which is expressed as compressive stress field, and a region adjacent, in a rolling direction, to the region having compressive stress has a region having tensile stress in a rolling direction, which is expressed as tensile stress field.

As described above, in the present disclosure, the "direction intersecting a rolling direction" means a direction of 45° or more and 135° or less along the surface of the steel sheet with respect to the rolling direction of the steel sheet. Further, the "linear/linearly" may be either a continuous linear shape or a discontinuous linear shape, and the linear shape may be a straight line, a curved line, a wavy line, a broken line, or a dotted line.

Additionally, as described above, the "strain region" in the present disclosure refers to a region where compressive stress remains in the rolling direction in the stress distribution obtained with the strain scanning method described below.

(2) The grain-oriented electrical steel sheet according to (1), wherein the linear strain region includes a region irradiated by an energy beam, and a length in a rolling direction of the linear strain region is twice or less of an irradiation width in a rolling direction of the energy beam.

As used herein, the "irradiation width" refers to the full width at half maximum of a spatial profile of the energy beam obtained with a slit method using a slit with a width of 30 μm.

(3) The grain-oriented electrical steel sheet according to (1) or (2), wherein a maximum value of the compressive stress is 60 MPa or more and a yield stress of the grain-oriented electrical steel sheet or less, and a maximum value of the tensile stress is 5 MPa or more and a yield stress of the grain-oriented electrical steel sheet or less.

(4) The grain-oriented electrical steel sheet according to any one of (1) to (3), wherein a magnetic flux density $B_8$ is 1.94 T or more.

In the present specification, the "magnetic flux density $B_8$" refers to a magnetic flux density when excited with a magnetizing force of 800 A/m.

(5) A method of manufacturing a grain-oriented electrical steel sheet, which is a method of manufacturing the grain-oriented electrical steel sheet according to any one of (1) to (4), comprising irradiating an energy beam in a direction intersecting a rolling direction of a steel sheet to form a linear strain region, wherein the irradiation is performed with a length in a rolling direction of the linear strain region being twice or less of an irradiation width in a rolling direction of the energy beam.

(6) The method of manufacturing a grain-oriented electrical steel sheet according to (5), wherein a magnetic flux density $B_8$ of the steel sheet is 1.94 T or more.

Advantageous Effect

According to the present disclosure, it is possible to obtain a grain-oriented electrical steel sheet that can reduce the energy loss and noise of a transformer, and a method of manufacturing the same.

DETAILED DESCRIPTION

Figure 1:
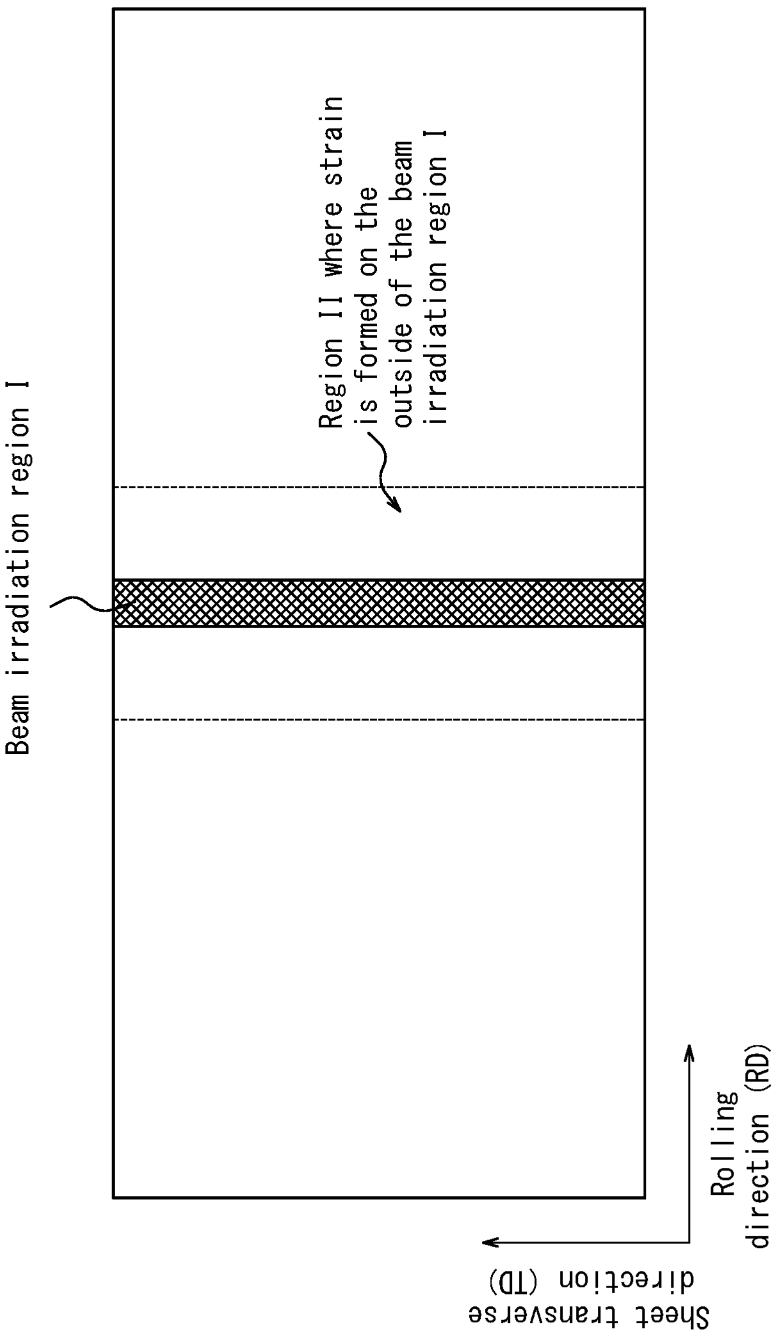
FIG. 1 schematically illustrates the strain distribution in a grain-oriented electrical steel sheet obtained with a conventional method.
Figure 2:
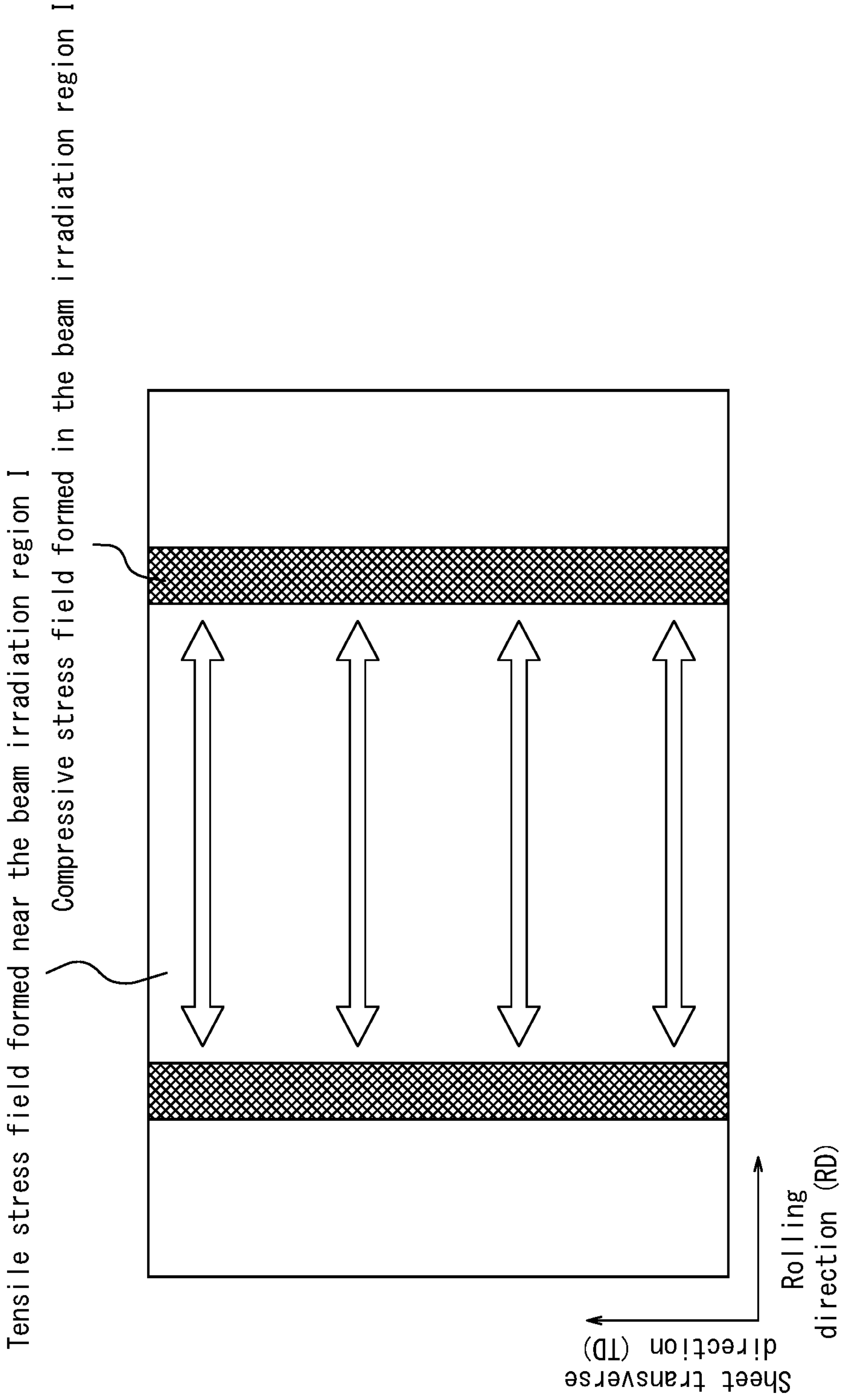
FIG. 2 schematically illustrates the strain distribution in a grain-oriented electrical steel sheet according to one embodiment of the present disclosure.
Figure 3:
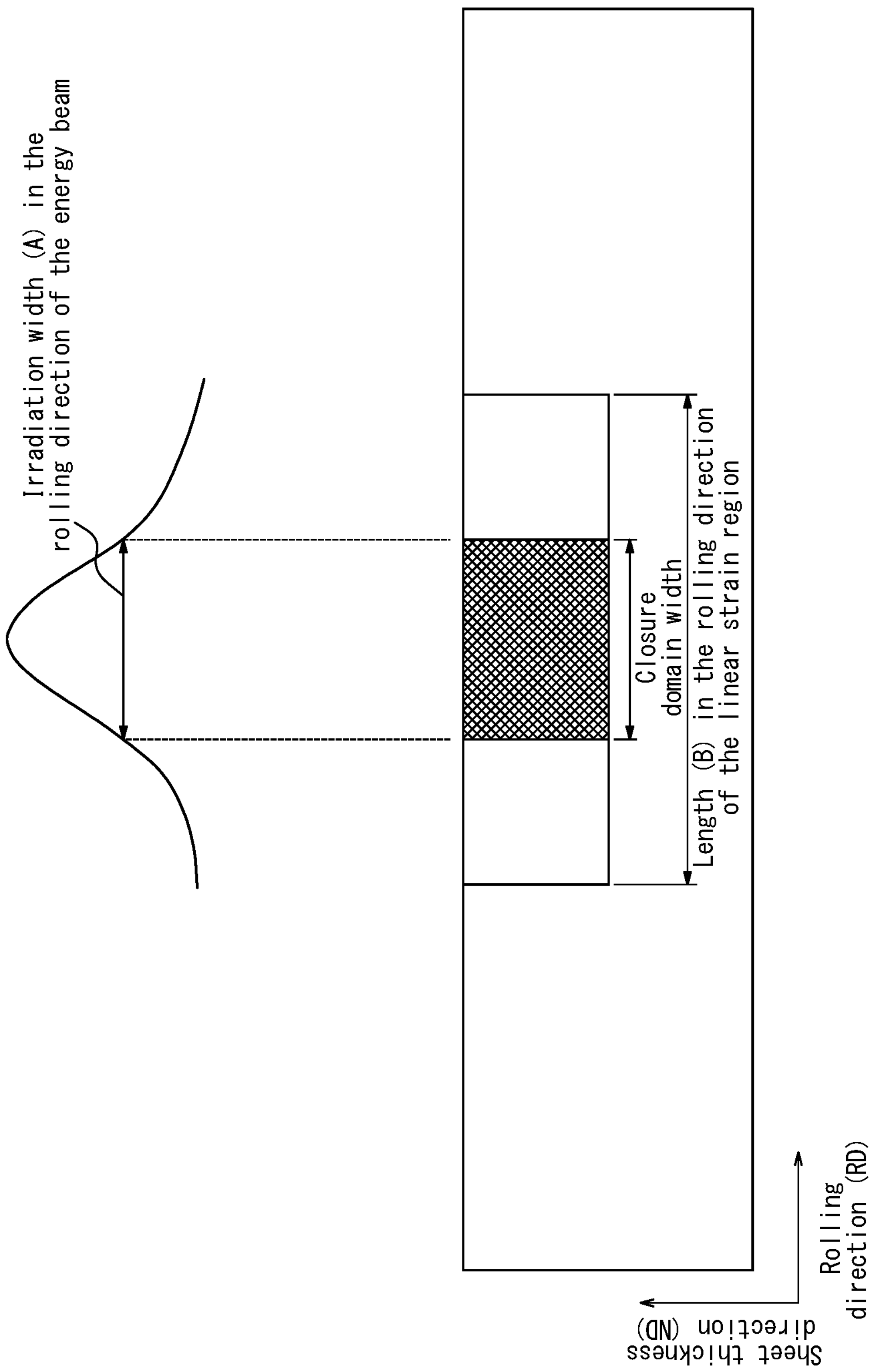
FIG. 3 schematically illustrates the relationship between the length (B) in the rolling direction of the linear strain region and the irradiation width (A) in the rolling direction of the energy beam.
Figure 4:
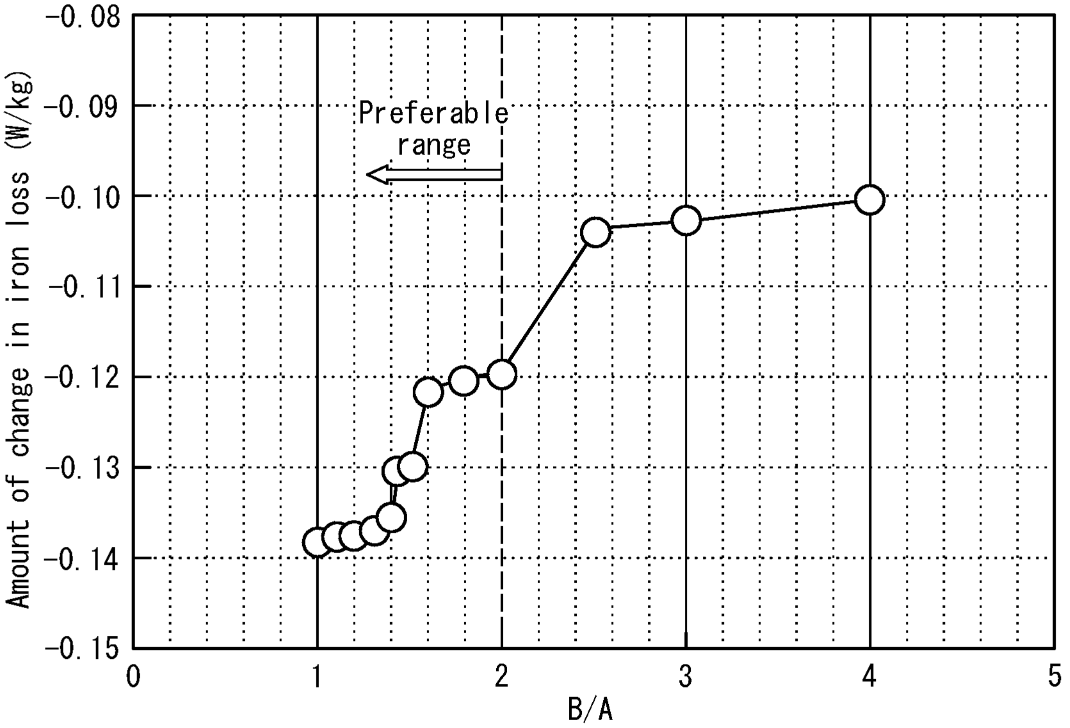
FIG. 4 is a graph that illustrates the relationship between the B/A value and the amount of change in iron loss in a grain-oriented electrical steel sheet according to one embodiment of the present disclosure.
Figure 5:
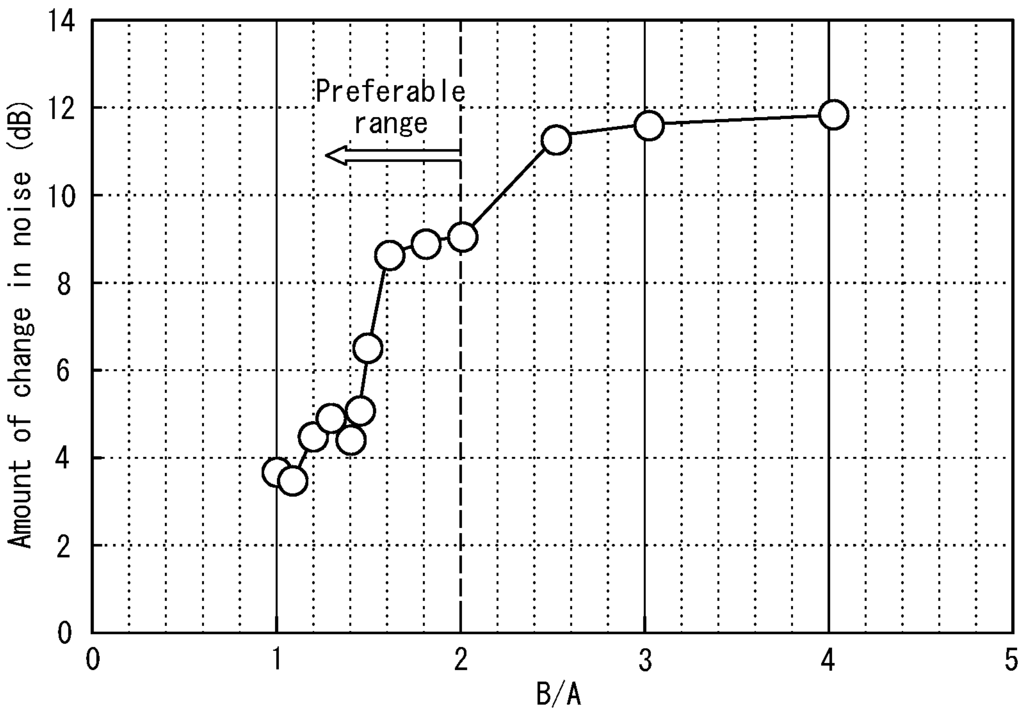
FIG. 5 is a graph that illustrates the relationship between the B/A value and the amount of change in noise in a transformer using a grain-oriented electrical steel sheet according to one embodiment of the present disclosure.
Figure 6:
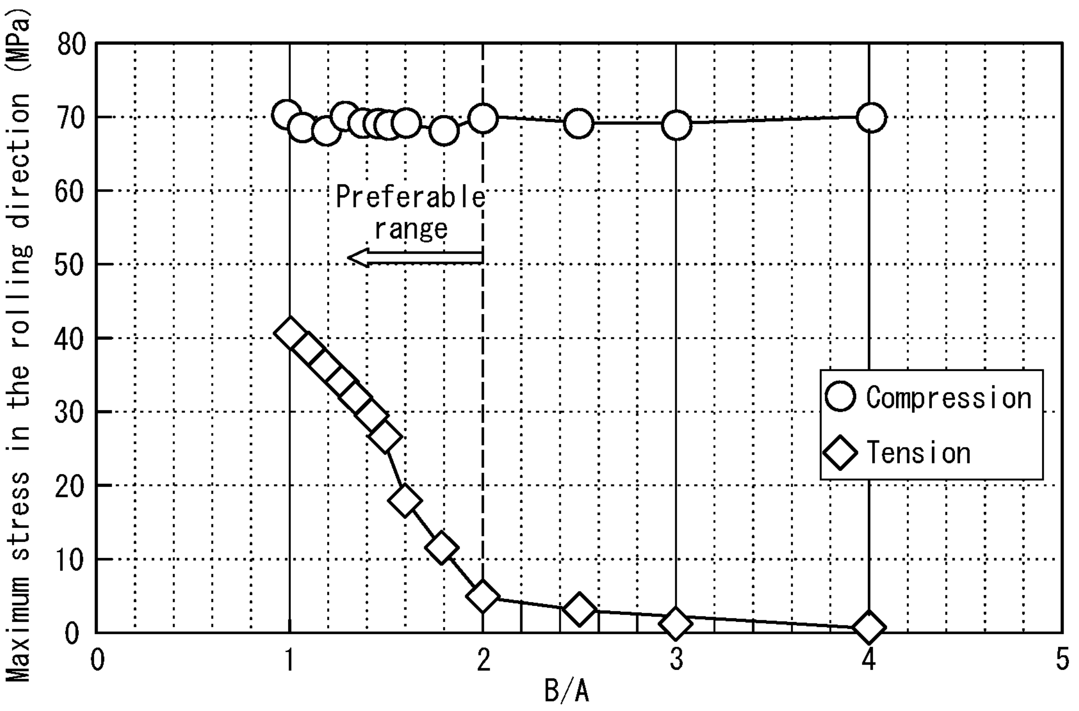
FIG. 6 is a graph that illustrates the relationship between the B/A value and the maximum value of stress in the rolling direction in a grain-oriented electrical steel sheet according to one embodiment of the present disclosure.
Figure 7:
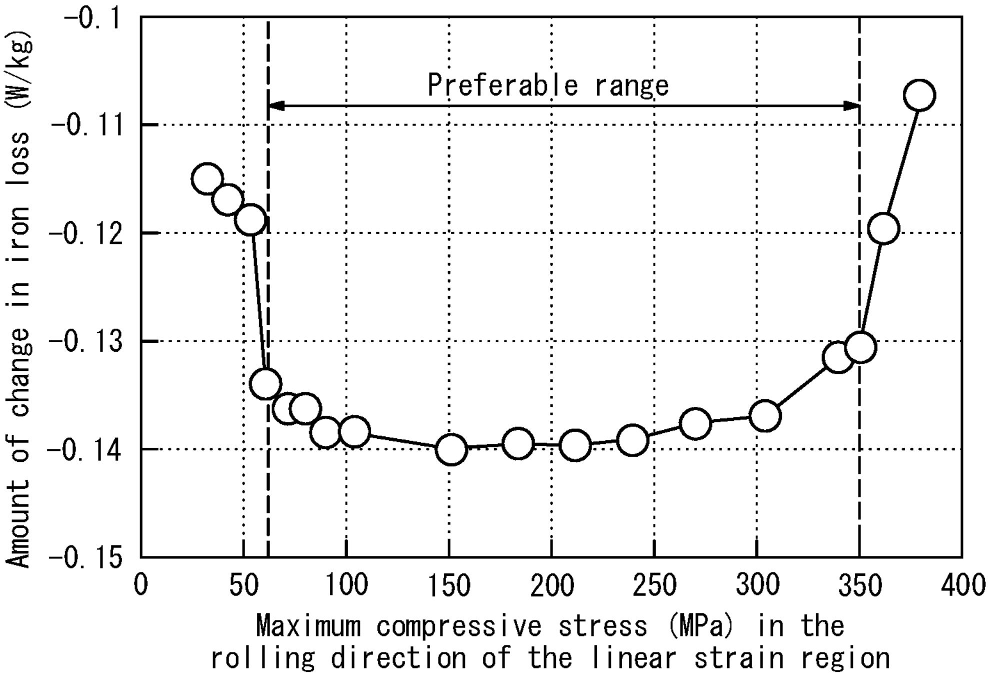
FIG. 7 is a graph that illustrates the relationship between the maximum value of compressive stress with respect to the rolling direction and the amount of change in iron loss in a grain-oriented electrical steel sheet according to one embodiment of the present disclosure.
Figure 8:
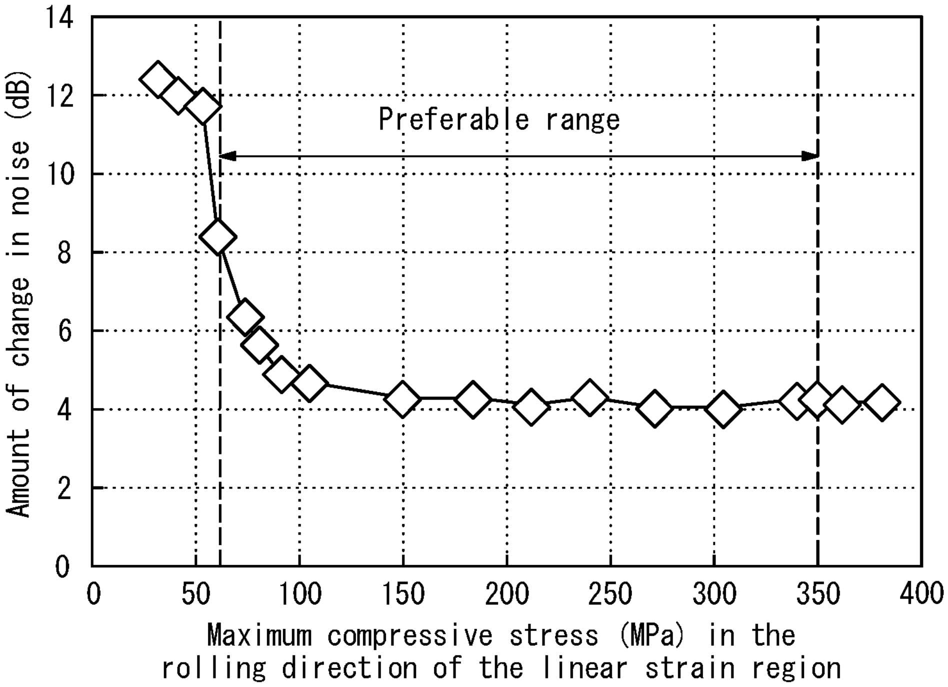
FIG. 8 is a graph that illustrates the relationship between the maximum value of compressive stress with respect to the rolling direction and the amount of change in noise in a transformer using a grain-oriented electrical steel sheet according to one embodiment of the present disclosure.
Figure 9:
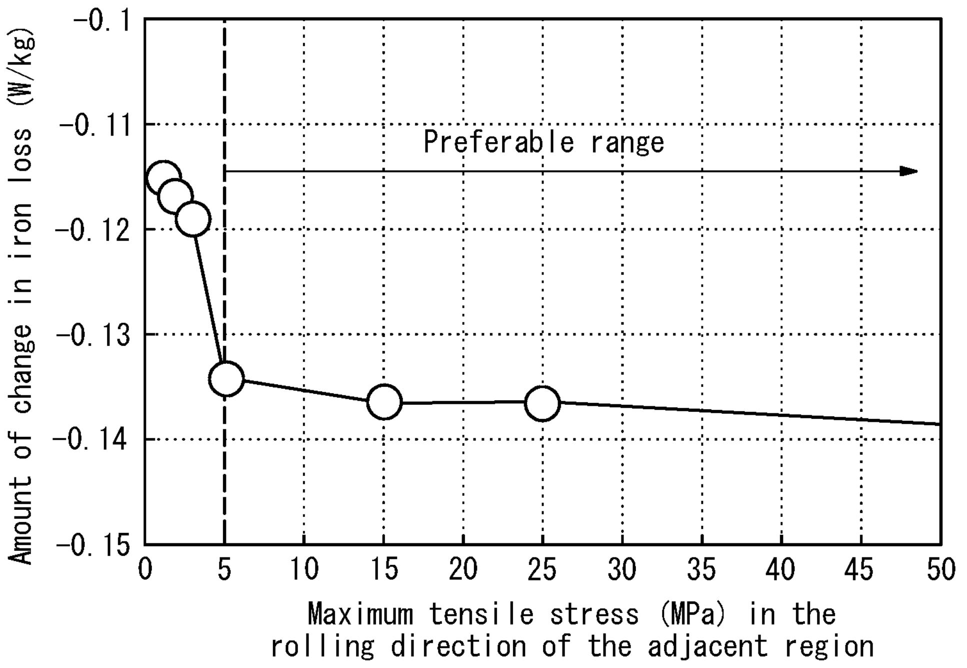
FIG. 9 is a graph that illustrates the relationship between the maximum value of tensile stress with respect to the rolling direction and the amount of change in iron loss in a grain-oriented electrical steel sheet according to one embodiment of the present disclosure.
Figure 9:
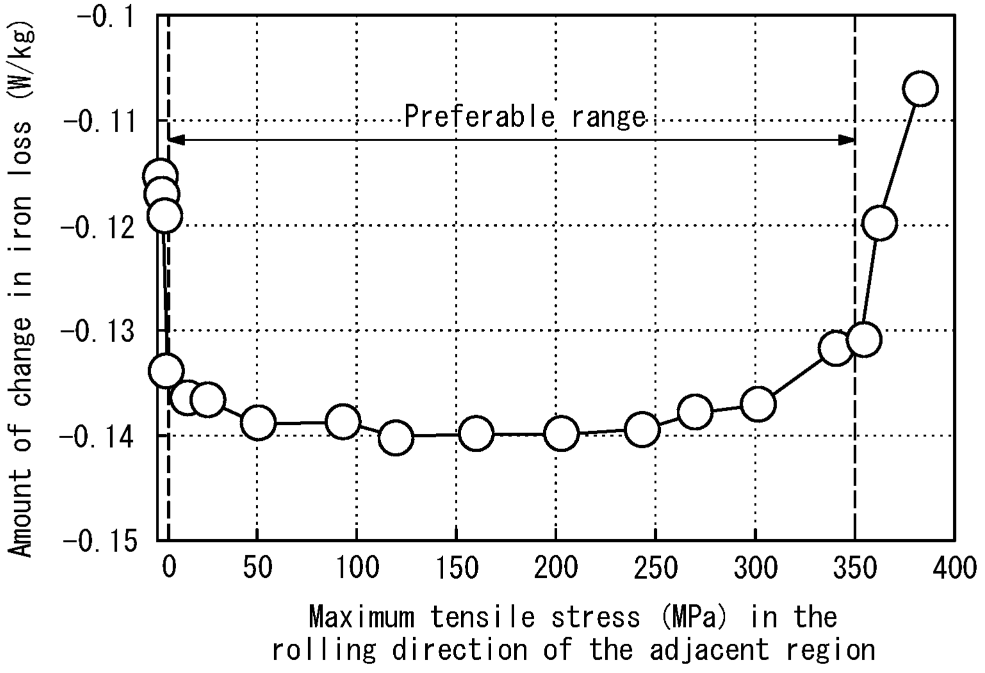
Figure 10:
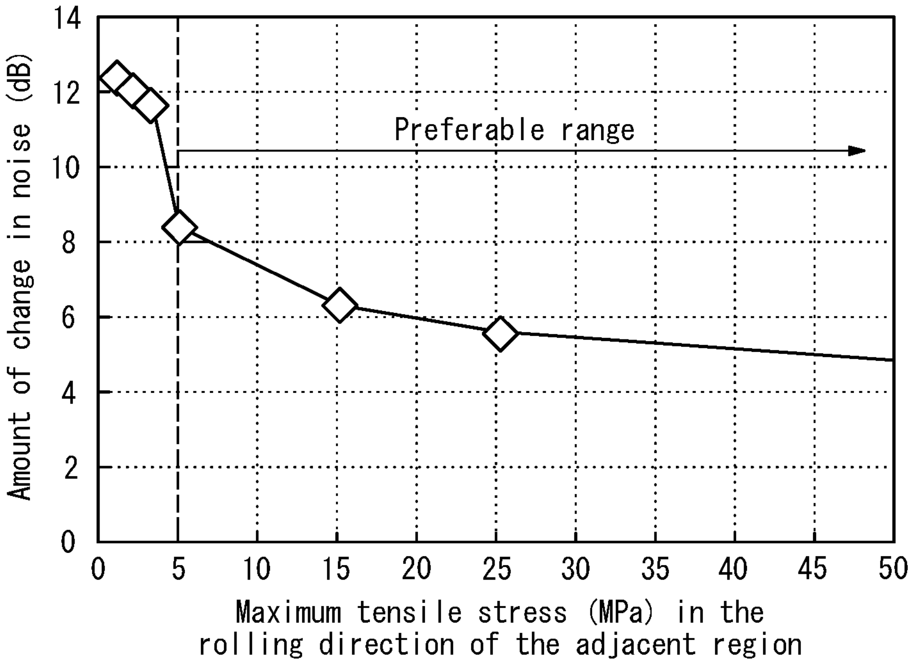
FIG. 10 is a graph that illustrates the relationship between the maximum value of tensile stress with respect to the rolling direction and the amount of change in noise in a transformer using a grain-oriented electrical steel sheet according to one embodiment of the present disclosure.
Figure 10:
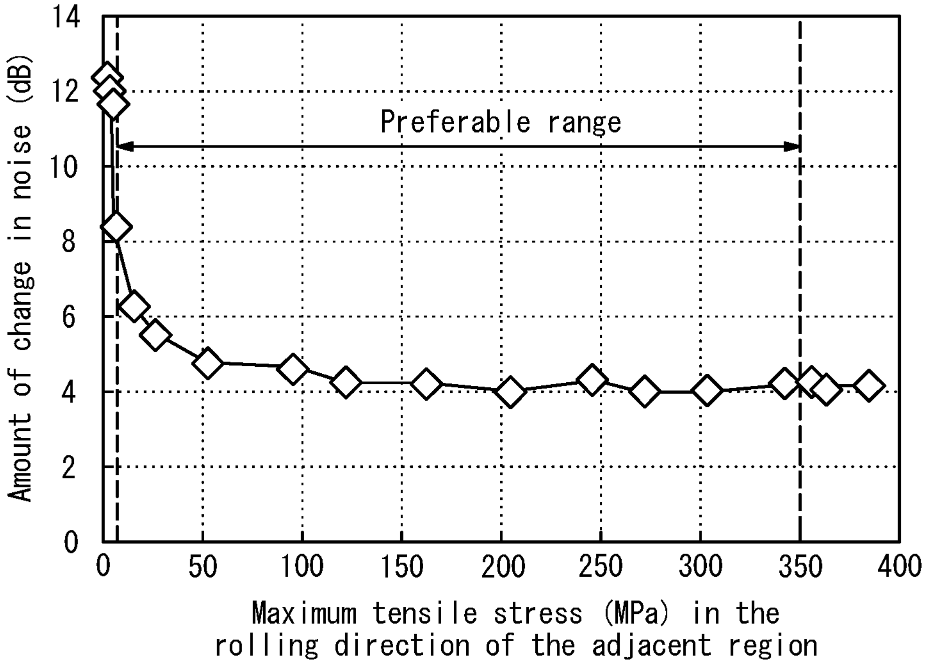

The following describes embodiments of the present disclosure in detail.

The following embodiments merely represent preferred examples, and the present disclosure is not limited to these examples.

(Grain-Oriented Electrical Steel Sheet)

The grain-oriented electrical steel sheet of the present disclosure has a linear strain region that extends linearly in a direction intersecting the rolling direction and has a region with compressive stress in the rolling direction, and an adjacent region that is adjacent to the rolling direction of the region with compressive stress. As used herein, the linear strain region at least partially has compressive stress in the rolling direction and preferably has compressive stress in the rolling direction over the entire region. On the other hand, the adjacent region has tensile stress in the rolling direction.

The grain-oriented electrical steel sheet of the present disclosure can be suitably obtained, for example, with the method of manufacturing a grain-oriented electrical steel sheet of the present disclosure.

When the grain-oriented electrical steel sheet has a region with compressive stress in the rolling direction in a predetermined direction and has a region with tensile stress in the rolling direction adjacent in the rolling direction to the region with compressive stress, it is possible to achieve both low iron loss and good magnetostrictive properties. Further, a transformer with low energy loss and low noise properties can be manufactured using such a grain-oriented electrical steel sheet.

Linear Strain Region and Adjacent Region

A plurality of linear strain regions can be introduced, for example, by irradiating an energy beam in a direction intersecting the rolling direction to a steel sheet manufactured with a known method.

The direction intersecting the rolling direction is preferably 60° or more along the surface of the steel sheet with respect to the rolling direction of the steel sheet. It is preferably 120° or less along the surface of the steel sheet with respect to the rolling direction of the steel sheet. It is more preferably in a range of 60° to 120° along the surface of the steel sheet with respect to the rolling direction of the steel sheet. The direction intersecting the rolling direction is more preferably 80° or more with respect to the rolling direction of the steel sheet. It is more preferably 100° or less with respect to the rolling direction of the steel sheet. It is still more preferably 90° with respect to the rolling direction of the steel sheet, that is, along the sheet transverse direction. This is because, when the linear strain region extends in the above direction, the area of the linear strain region (i.e., the amount of strain) introduced into the grain-oriented electrical steel sheet can be prevented from becoming too large, which further suppresses the deterioration of magnetostrictive properties.

As used herein, the linear strain region is a region in which compressive stress remains in the rolling direction in at least a part of the region in a stress distribution calculated with the strain scanning method (reference: Transactions of the JSME (A) Vol. 71, No. 711, 2005, pp. 1530-1537) along the rolling direction of the steel sheet, where the compressive stress may remain in the rolling direction over the entire region. Regions in the linear strain region other than the region in which compressive stress remains include one without stress.

On the other hand, the adjacent region is a region directly or indirectly adjacent to the rolling direction of the region where compressive stress remains described above, and it is a region where tensile stress remains in the rolling direction in the stress distribution obtained with the strain scanning method described above. There is no compressive stress in the rolling direction in the adjacent region.

The following describes a method of measuring stress with the strain scanning method in more detail.

X-ray diffraction (XRD) measurement is performed using high-intensity X-rays, and the strain component is measured from the change in the d value (spacing of lattice planes) between a no-strain point (reference point) and a measurement point. This is measured in three directions: the rolling direction (RD), the sheet transverse direction (TD), and the thickness direction (ND). The stress values in the rolling direction, the sheet transverse direction, and the thickness direction are each calculated using the obtained measured value of strain and values of material properties such as Young's modulus.

Therefore, in a residual stress profile along the rolling direction, the grain-oriented electrical steel sheet of the present disclosure exhibits a stress distribution in which the stress changes continuously from compression to tension depending on the position in the rolling direction. In this way, the linear strain region and the adjacent region of the grain-oriented electrical steel sheet of the present disclosure can be confirmed.

In the residual stress profile, the maximum value of the compressive component is the "maximum value of compressive stress in the rolling direction", and the maximum value of the tensile component is the "maximum value of tensile stress in the rolling direction".

B/A Value

It is preferable that the linear strain region of the grain-oriented electrical steel sheet of the present disclosure include an energy beam irradiation region and that the length (B) in the rolling direction of the linear strain region is twice the irradiation width in the rolling direction of the energy beam or less. It is more preferably 1.6 times or less and further preferably 1.5 times or less. In other words, the B/A value is preferably 2 or less, more preferably 1.6 or less, and still more preferably 1.5 or less. The lower limit of the B/A value is usually 1.

When the length (B) is twice the irradiation width (A) or less, that is, the B/A value is 2 or less in the grain-oriented electrical steel sheet, the iron loss and the magnetostrictive properties of the grain-oriented electrical steel sheet can be further improved. Further, when such a grain-oriented electrical steel sheet is used to manufacture a transformer, the energy loss and the noise properties of the transformer can be further improved.

Maximum Value of Stress

In the grain-oriented electrical steel sheet of the present disclosure, the maximum value of the compressive stress in the rolling direction of the linear strain region is preferably 60 MPa or more and more preferably 80 MPa or more. Further, it is preferably the yield stress or less, which is 350 MPa or less in the case of the grain-oriented electrical steel sheet used in the experiment and the Examples described below. It is more preferably 300 MPa or less and still more preferably 250 MPa or less. The maximum value of the compressive stress is more preferably 60 MPa or more and the yield stress or less, which is 60 MPa or more and 350 MPa or less in the case of the grain-oriented electrical steel sheet used in the experiment and the Examples described below.

In the grain-oriented electrical steel sheet of the present disclosure, the maximum value of the tensile stress in the rolling direction of the adjacent region is preferably 5 MPa or more and more preferably 20 MPa or more. Further, it is preferably the yield stress or less, which is 350 MPa or less in the case of the grain-oriented electrical steel sheet used in the experiment and the Examples described below. It is more preferably 300 MPa or less and still more preferably 150 MPa or less. The maximum value of the tensile stress is more preferably 5 MPa or more and the yield stress or less, which is 5 MPa or more and 350 MPa or less in the case of the grain-oriented electrical steel sheet used in the experiment and the Examples described below.

When the maximum value of the compressive stress and the maximum value of the tensile stress are within the above ranges, the iron loss of the grain-oriented electrical steel sheet can be further improved. Further, when a transformer is manufactured using such a grain-oriented electrical steel sheet, the energy loss of the transformer can be further improved.

Magnetic Flux Density $B_8$

The grain-oriented electrical steel sheet of the present disclosure preferably has a magnetic flux density $B_8$ of 1.92 T or more and more preferably has a magnetic flux density $B_8$ of 1.94 T or more.

When the $B_8$ of the grain-oriented electrical steel sheet is the above value or more, the iron loss and the magnetostrictive properties of the grain-oriented electrical steel sheet can be further improved. Further, when a transformer is manufactured using such a grain-oriented electrical steel sheet, the energy loss and the noise properties of the transformer can be further improved.

(Method of Manufacturing Grain-Oriented Electrical Steel Sheet)

The method of manufacturing a grain-oriented electrical steel sheet of the present disclosure is a method of manufacturing a grain-oriented electrical steel sheet which has a linear strain region that extends linearly in a direction intersecting the rolling direction and has a region with compressive stress in the rolling direction, and an adjacent region that is adjacent to the rolling direction of the region with compressive stress and has tensile stress in the rolling direction. In the method of manufacturing a grain-oriented electrical steel sheet of the present disclosure, when an energy beam is applied in a direction intersecting the rolling direction of the steel sheet to form a linear strain region, the irradiation is performed with the length in the rolling direction of the linear strain region being twice the irradiation width in the rolling direction of the energy beam or less.

The various features of a grain-oriented electrical steel sheet manufactured with the manufacturing method of the present disclosure are the same as the features of the grain-oriented electrical steel sheet of the present disclosure described above.

Magnetic Flux Density $B_8$ of Steel Sheet

A steel sheet (grain-oriented electrical steel sheet before introduction of strain) to be used in the manufacturing method of the present disclosure preferably has a magnetic flux density $B_8$ of 1.92 T or more and more preferably has a magnetic flux density $B_8$ of 1.94 T or more.

The higher the magnetic flux density $B_8$ of the steel sheet is, or in other words, the higher the crystal orientation of the steel sheet is, the greater the magnetoelastic effect when strain is introduced is. Therefore, a closure domain is easily formed even when the introduced strain is weak. In other words, as the magnetic flux density $B_8$ of the steel sheet as a material increases, the effect of reducing iron loss and the effect of reducing noise can be further improved.

Energy Beam Irradiation Condition

The energy beam to be applied to form a linear strain region in the steel sheet is not particularly limited, and examples thereof include electron beam, laser, plasma flame, and any other beam source capable of introducing thermal strain. Any of these types of energy beams can be used to achieve the same effect.

Therefore, a known electron beam irradiation device, laser irradiation device, plasma flame irradiation device and the like can be suitably used to form a linear strain region in the steel sheet, for example.

Among the above, the energy beam is preferably an electron beam, and it is preferable to use an electron beam irradiation device, from the viewpoint of ease of locally introducing strain. The following describes a case where the energy beam is an electron beam as an example, but the present disclosure is not limited to this example.

In the electron beam irradiation, for example, one or more linear strain regions can be formed by using one or more electron guns or electron beam irradiation devices to apply the beam one or more times in a direction intersecting the rolling direction of the steel sheet. It is preferable to introduce multiple linear strain regions to sufficiently impart tensile stress to the grain-oriented electrical steel sheet.

Irradiation Direction

The scanning direction to apply the beam is preferably 60° or more along the surface of the steel sheet with respect to the rolling direction of the steel sheet. It is preferably 120° or less along the surface of the steel sheet with respect to the rolling direction of the steel sheet. It is more preferably in a range of 60° to 120° along the surface of the steel sheet with respect to the rolling direction of the steel sheet. The scanning direction of the beam is more preferably 80° or more with respect to the rolling direction of the steel sheet. It is more preferably 100° or less with respect to the rolling direction of the steel sheet. It is still more preferably 90° with respect to the rolling direction of the steel sheet, that is, along the sheet transverse direction. When the deviation of the scanning direction of the beam from the sheet transverse direction increases, the amount of strain introduced into the steel sheet increases excessively, resulting in deterioration of magnetostrictive properties.

Irradiation Form

The irradiation form of beam can be continuous irradiation in which the beam is continuously applied along the scanning direction, or dot irradiation in which the beam repeatedly stops and moves. Both irradiation forms can improve the iron loss and the magnetostrictive properties.

Accelerating Voltage

As the accelerating voltage of the electron beam increases, the electrons move more and more straightly, and the thermal effect on the outside of the beam irradiation region decreases. Therefore, the accelerating voltage is preferably as high as possible. From this point of view, the accelerating voltage is preferably 60 kV or more, more preferably 90 kV or more, and still more preferably 120 kV or more.

On the other hand, a too high accelerating voltage renders it difficult to shield X-rays formed by the electron beam irradiation. Therefore, the accelerating voltage is preferably 300 kV or less and more preferably 200 kV or less from the viewpoint of practice.

Spot Diameter (Irradiation Width A)

When applying an electron beam, the spot diameter in the rolling direction of the electron beam usually corresponds to the "irradiation width (A) in the rolling direction of the energy beam". As the spot diameter decreases, it is easier to locally introduce strain. Therefore, the spot diameter is preferably as small as possible. From this point of view, the spot diameter of the electron beam is preferably 300 μm or less, more preferably 280 μm or less, and still more preferably 260 μm or less.

Further, the spot diameter may be 30 μm or more from the viewpoint of practice.

As used herein, the "spot diameter" refers to the full width at half maximum of a beam profile obtained with a slit method using a slit with a width of 30 μm. The "halo diameter" described below refers to a width with an intensity where the maximum intensity is 1% or more in the beam profile obtained with the same method as above.

Beam Current

From the viewpoint of reducing the spot diameter, it is preferable to have a small beam current as well. This is because, as the current increases, the spot diameter tends to increase due to Coulomb repulsion, rendering it difficult to introduce strain locally. From this point of view, the beam current is preferably 40 mA or less.

On the other hand, a too small beam current cannot provide sufficient energy to form strain, so that the beam current is preferably 0.5 mA or more.

Degree of Vacuum in Irradiation Region

When the electron beam is scattered by gas molecules, the spot diameter and the halo diameter increase, and the energy decreases. Therefore, the degree of vacuum in the beam irradiation region is preferably as high as possible, and it is preferable to set the degree of vacuum to a pressure of 3 Pa or less.

The lower limit of the degree of vacuum is not particularly limited. However, a too low degree of vacuum increases the cost of a vacuum system such as a vacuum pump. From this point of view, it is preferable to set the degree of vacuum to a pressure of $10^{-5}$ Pa or more in practice.

Method of Adjusting Length B

Figure 11:
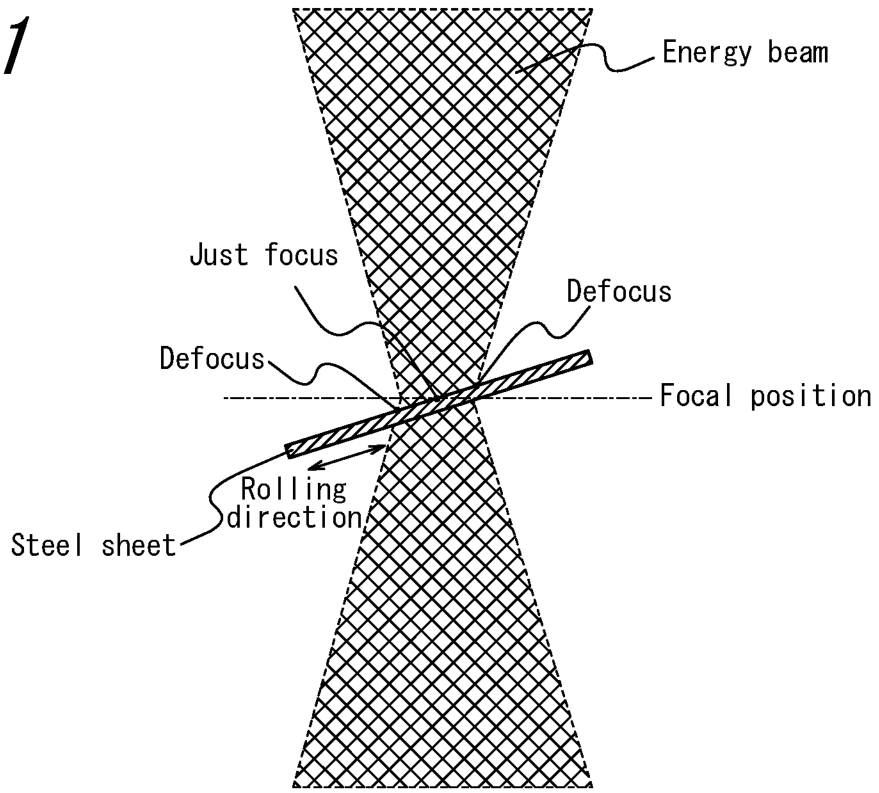
FIG. 11 schematically illustrates an example of a method of defocusing and irradiating a beam.
Figure 11:
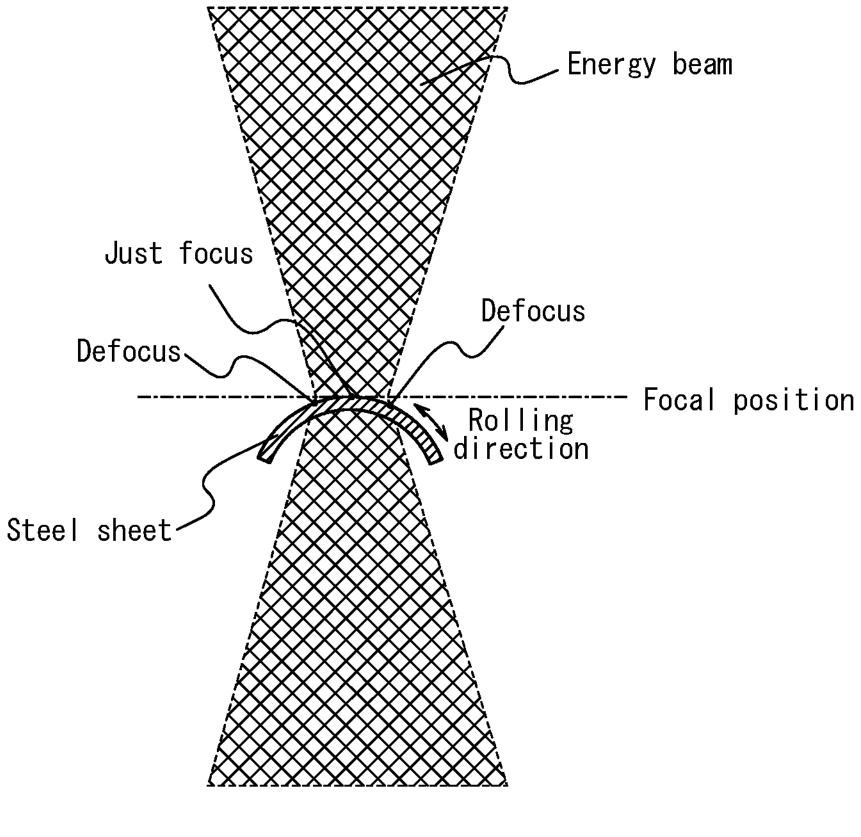

As described above, it is desirable to reduce the length (B) in the rolling direction of the linear strain region to suppress the introduction of strain to the outside of the beam irradiation region. A method of adjusting the length (B) is not particularly limited, and examples thereof include a method in which the beam is defocused and applied with an inclination provided in the rolling direction of the steel sheet with respect to the beam to be applied (upper part of FIG. 11) or with a curvature provided in the rolling direction of the steel sheet with respect to the beam to be irradiated (lower part of FIG. 11).

In the above adjustment method, it is easier to adjust the beam path long or short as the distance from the center of the beam along the rolling direction of the steel sheet increases. By deliberately shifting the focus of the beam as described above, it is possible to reduce the efficiency of heat inputting by beam and prevent a strain region from forming outside the desired region.

Other methods of adjusting the length (B) include, for example, a method of providing physical obstacles such as shutters and slits on the path of the beam. In this adjustment method, the beam which spreads wider than the spot diameter (halo), can be cut by a slit or other means to limit the region into which strain is to be introduced.

Among the above-mentioned methods, a suitable adjustment method for achieving better stress distribution, that is, better compressive stress and tensile stress is a method of applying the beam with a curvature provided in the rolling direction of the steel sheet. More specifically, it is a method where the steel sheet is passed along a roller having a certain curvature (not illustrated in the figure) while applying the beam at the apex of the steel sheet with protrusions corresponding to the curvature of the roller, as illustrated in the lower part of FIG. 11.

From the viewpoint of better controlling the stress distribution formed in the steel sheet, the radius of curvature of the roller is preferably 50 mm or more. Further, it is preferably 600 mm or less, more preferably 400 mm or less, and still more preferably 200 mm or less.

EXAMPLES

The following describes the present disclosure in detail based on examples. Note that the following examples merely represent preferred examples, and the present disclosure is not limited to these examples. It is also possible to carry out the following examples by making modifications without departing from the scope and sprit of the present disclosure, and such modes are also encompassed by the technical scope of the present disclosure.

An electron beam as an energy beam was continuously and linearly irradiated on the surface of a steel sheet having a magnetic flux density $B_8$ of 1.92 T and a steel sheet having a magnetic flux density $B_8$ of 1.94 T, respectively, where the steel sheets were manufactured with a known method, and the electron beam was applied in a direction intersecting the rolling direction of the steel sheet. When applying the electron beam, magnetic domain refining was performed by varying the beam power as listed in Table 1, and samples of grain-oriented electrical steel sheet in which various magnitudes of stress had been introduced were prepared.

The electron beam irradiation conditions were as follows: degree of vacuum in the beam irradiation region: 0.3 Pa, irradiation direction: about 90° with respect to the rolling direction, beam power: 0.6 kW to 6 kW (accelerating voltage: 60 kV to 300 kV, beam current: 10 mA to 20 mA).

During the beam irradiation, the steel sheet was passed along a roller having the radius of curvature listed in Table 1 while performing the beam irradiation, where the ratio of the length B in the rolling direction of the linear strain region with respect to the irradiation width A in the rolling direction of the energy beam (spot diameter of the electron beam: 200 μm), i.e., the B/A value, was controlled.

The magnetic flux density $B_8$, iron loss $W_{17/50}$, and strain distribution were measured for the samples of grain-oriented electrical steel sheet that had undergone magnetic domain refining as described above, and the stress distribution including the maximum value of compressive stress and the maximum value of tensile stress in the rolling direction was calculated from the measured strain distribution.

As used herein, the magnetic flux density $B_8$ was a magnetic flux density (T) measured when excited with a magnetizing force of 800 A/m.

The iron loss $W_{17/50}$ was an iron loss value (W/kg) measured when a magnetic field with a frequency of 50 Hz and a magnetic flux density of 1.7 T was applied using a single-plate magnetic property measurement device.

The stress distribution was obtained by determining the strain components in each direction by XRD measurement as described above and then converting to stress values (MPa) using values of physical properties such as modulus of elasticity. According to the stress distribution, it was confirmed that the grain-oriented electrical steel sheet has a linear strain region that extends in a direction intersecting the rolling direction and has a region with compressive stress in the rolling direction, and an adjacent region that is adjacent to the rolling direction of the region with compressive stress and has tensile stress in the rolling direction.

Further, a three-phase transformer model for transformer was prepared using the sample of grain-oriented electrical steel sheet that had undergone magnetic domain refining as described above. The transformer model was excited in a soundproof room under the conditions of a maximum magnetic flux density Bm of 1.7 T and a frequency of 50 Hz, and the noise level (dBA) was measured using a sound level meter.

The results are listed in Table 1. Table 1 indicates that the iron loss of the grain-oriented electrical steel sheet was high in Comparative Examples No. 1 and No. 15, which did not have both the prescribed compressive stress and tensile stress, and a transformer prepared using the grain-oriented electrical steel sheet also had a high noise level. In other words, it is understood that, when the grain-oriented electrical steel sheet is an Example having a linear strain region that extends in a direction intersecting the rolling direction and has a region with compressive stress in the rolling direction, and an adjacent region that is adjacent to the rolling direction of the region with compressive stress and has tensile stress in the rolling direction, it is possible to obtain a grain-oriented electrical steel sheet that has both low iron loss and good magnetostrictive properties and is suitable for manufacturing transformers with low energy loss and low noise properties.

Further, it is confirmed that a grain-oriented electrical steel sheet with a B/A value of 2 or less has more sufficient tensile stress in the rolling direction.

Furthermore, it is also confirmed that the low noise effect of a transformer can be further enhanced by using a grain-oriented electrical steel sheet with higher magnetic flux density $B_8$.

TABLE 1

| No. | Electron beam accelerating voltage [kV] | Electron beam current [mA] | Radius of curvature of roller during irradiation [mm] | B/A value | Magnetic flux density $B_8$ of grain-oriented electrical steel sheet [T] | Maximum value of compressive stress in rolling direction of grain-oriented electrical steel sheet [MPa] | Maximum value of tensile stress in rolling direction of grain-oriented electrical steel sheet [MPa] | Iron loss $W_{17/50}$ of grain-oriented electrical steel sheet [W/kg] | Transformer noise level [dBA] | Classification |
|---|---|---|---|---|---|---|---|---|---|---|
| 1 | 60 | 10 | 500 | 2.5 | 1.92 | 30 | 0 | 0.70 | 42.7 | Comparative Example |
| 2 | 60 | 10 | 300 | 2.0 | 1.92 | 30 | 5 | 0.69 | 36.6 | Example |
| 3 | 60 | 10 | 100 | 1.5 | 1.92 | 30 | 20 | 0.69 | 36.1 | Example |
| 4 | 100 | 10 | 500 | 2.5 | 1.92 | 60 | 4 | 0.69 | 40.0 | Example |
| 5 | 100 | 10 | 300 | 2.0 | 1.92 | 60 | 10 | 0.67 | 36.7 | Example |
| 6 | 100 | 10 | 100 | 1.5 | 1.92 | 60 | 25 | 0.66 | 35.9 | Example |
| 7 | 120 | 10 | 500 | 2.5 | 1.92 | 70 | 4 | 0.69 | 40.3 | Example |
| 8 | 120 | 10 | 300 | 2.0 | 1.92 | 70 | 20 | 0.67 | 36.9 | Example |
| 9 | 120 | 10 | 100 | 1.5 | 1.92 | 70 | 40 | 0.66 | 35.6 | Example |
| 10 | 200 | 10 | 300 | 1.5 | 1.92 | 200 | 100 | 0.66 | 36.5 | Example |
| 11 | 200 | 15 | 300 | 1.5 | 1.92 | 350 | 150 | 0.66 | 36.4 | Example |
| 12 | 300 | 10 | 300 | 2.0 | 1.92 | 360 | 200 | 0.68 | 36.6 | Example |
| 13 | 300 | 15 | 100 | 1.5 | 1.92 | 360 | 300 | 0.68 | 35.8 | Example |
| 14 | 300 | 20 | 100 | 1.5 | 1.92 | 380 | 360 | 0.69 | 36.2 | Example |
| 15 | 60 | 10 | 500 | 2.5 | 1.94 | 30 | 0 | 0.69 | 41.7 | Comparative Example |
| 16 | 60 | 10 | 300 | 2.0 | 1.94 | 30 | 5 | 0.68 | 35.1 | Example |
| 17 | 60 | 10 | 100 | 1.5 | 1.94 | 30 | 20 | 0.68 | 34.7 | Example |
| 18 | 100 | 10 | 500 | 2.5 | 1.94 | 60 | 4 | 0.68 | 39.0 | Example |
| 19 | 100 | 10 | 300 | 2.0 | 1.94 | 60 | 10 | 0.65 | 35.2 | Example |
| 20 | 100 | 10 | 100 | 1.5 | 1.94 | 60 | 25 | 0.64 | 34.1 | Example |
| 21 | 120 | 10 | 500 | 2.5 | 1.94 | 70 | 4 | 0.68 | 39.3 | Example |
| 22 | 120 | 10 | 300 | 2.0 | 1.94 | 70 | 20 | 0.65 | 35.1 | Example |
| 23 | 120 | 10 | 100 | 1.5 | 1.94 | 70 | 40 | 0.64 | 34.2 | Example |
| 24 | 200 | 10 | 300 | 1.5 | 1.94 | 200 | 100 | 0.64 | 34.5 | Example |
| 25 | 200 | 15 | 300 | 1.5 | 1.94 | 350 | 150 | 0.64 | 34.7 | Example |
| 26 | 300 | 10 | 300 | 2.0 | 1.94 | 360 | 200 | 0.67 | 35.4 | Example |
| 27 | 300 | 15 | 100 | 1.5 | 1.94 | 360 | 300 | 0.67 | 34.3 | Example |
| 28 | 300 | 20 | 100 | 1.5 | 1.94 | 380 | 360 | 0.68 | 35.0 | Example |

INDUSTRIAL APPLICABILITY

According to the present disclosure, it is possible to obtain a grain-oriented electrical steel sheet that can reduce the energy loss and noise of a transformer, and a method of manufacturing the same.

The invention claimed is:

1. A grain-oriented electrical steel sheet comprising a linear strain region extending linearly in a direction intersecting a rolling direction of the steel sheet, wherein the linear strain region has a region having compressive stress in a rolling direction, a region adjacent in a rolling direction to the region having compressive stress has a region having tensile stress in a rolling direction, the linear strain region includes a region irradiated by an energy beam such that a B/A value, which is a length (B) in a rolling direction of the linear strain region with respect to a closure domain width (A) in a rolling direction, is 1 to 2, and a maximum value of the compressive stress is a yield stress of the grain-oriented electrical steel sheet or less.

2. The grain-oriented electrical steel sheet according to claim 1, wherein a magnetic flux density $B_8$ is 1.94 T or more.

3. The grain-oriented electrical steel sheet according to claim 1, wherein a maximum value of the compressive stress is 60 MPa or more and a yield stress of the grain-oriented electrical steel sheet or less, and a maximum value of the tensile stress is 5 MPa or more and a yield stress of the grain-oriented electrical steel sheet or less.

4. The grain-oriented electrical steel sheet according to claim 3, wherein a magnetic flux density $B_8$ is 1.94 T or more.

5. The grain-oriented electrical steel sheet according to claim 1, wherein the energy beam is an electron beam.

6. The grain-oriented electrical steel sheet according to claim 1, wherein the linear strain region is composed of the region having compressive stress in a rolling direction and optionally a region without stress.

7. The grain-oriented electrical steel sheet according to claim 1, wherein an amount of change in iron loss after the energy beam irradiation compared to before the energy beam irradiation is −0.138 to −0.119 W/kg or less, and an amount of change in noise after the energy beam irradiation compared to before the energy beam irradiation is 3.7 to 9.1 dB.

8. The grain-oriented electrical steel sheet according to claim 1, wherein the steel sheet comprises multiple linear strain regions extending linearly in a direction intersecting a rolling direction of the steel sheet, each of the linear strain regions has a region having compressive stress in a rolling direction, the steel sheet further comprises an adjacent region, apart from the linear strain regions, the adjacent region being located between and adjacent in a rolling direction to the linear strain regions, wherein the adjacent region has a region having tensile stress in a rolling direction, exhibiting a stress distribution in which the stress changes continuously from compression to tension, and from the tension to compression in the rolling direction.

9. The grain-oriented electrical steel sheet according to claim 1, wherein the linear strain region extends continuously and linearly in a direction intersecting a rolling direction of the steel sheet.

10. A method of manufacturing a grain-oriented electrical steel sheet, which is a method of manufacturing the grain-oriented electrical steel sheet according to claim 1, comprising irradiating an energy beam in a direction intersecting a rolling direction of a steel sheet to form a linear strain region, wherein the irradiation is performed such that a B/A value, which is a length (B) in a rolling direction of the linear strain region with respect to a closure domain width (A) in a rolling direction, is 1 to 2.

11. A method of manufacturing a grain-oriented electrical steel sheet, which is a method of manufacturing the grain-oriented electrical steel sheet according to claim 3, comprising irradiating an energy beam in a direction intersecting a rolling direction of a steel sheet to form a linear strain region, wherein the irradiation is performed such that a B/A value, which is a length (B) in a rolling direction of the linear strain region with respect to a closure domain width (A) in a rolling direction, is 1 to 2.

12. A method of manufacturing a grain-oriented electrical steel sheet, which is a method of manufacturing the grain-oriented electrical steel sheet according to claim 2, comprising irradiating an energy beam in a direction intersecting a rolling direction of a steel sheet to form a linear strain region, wherein the irradiation is performed such that a B/A value, which is a length (B) in a rolling direction of the linear strain region with respect to a closure domain width (A) in a rolling direction, is 1 to 2.

13. A method of manufacturing a grain-oriented electrical steel sheet, which is a method of manufacturing the grain-oriented electrical steel sheet according to claim 4, comprising irradiating an energy beam in a direction intersecting a rolling direction of a steel sheet to form a linear strain region, wherein the irradiation is performed such that a B/A value, which is a length (B) in a rolling direction of the linear strain region with respect to a closure domain width (A) in a rolling direction, is 1 to 2.

14. The method of manufacturing a grain-oriented electrical steel sheet according to claim 10, wherein a magnetic flux density $B_8$ of the steel sheet is 1.94 T or more.

* * * * *